Sept. 1, 1964 A. S. VANDERHOOF 3,146,684
FLUID PRESSURE PISTON AND CYLINDER DEVICE
WITH NON-ROTATABLE PISTON
Filed Jan. 14, 1963 2 Sheets-Sheet 1

INVENTOR.
Alton S. Vanderhoof
BY
ATTORNEY

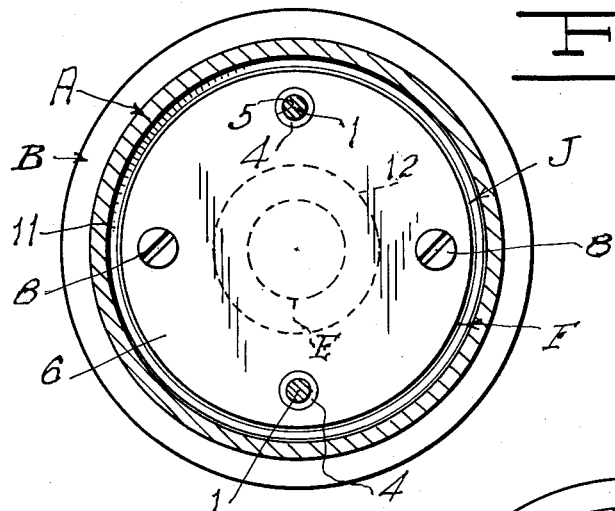
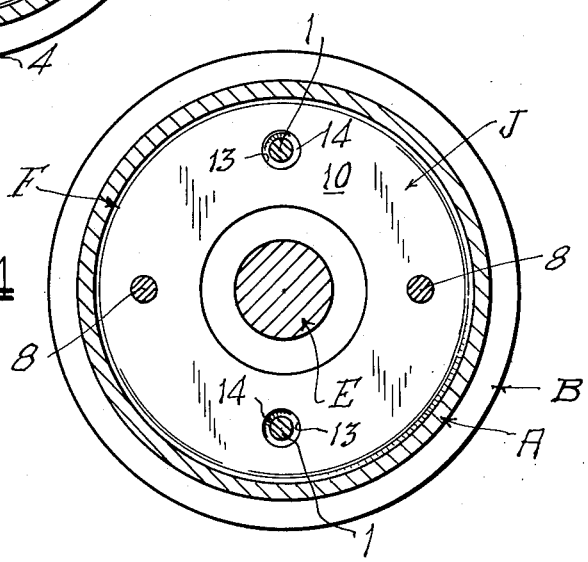
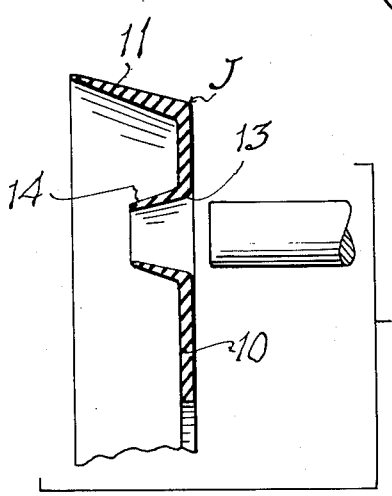

United States Patent Office 3,146,684
Patented Sept. 1, 1964

3,146,684
FLUID PRESSURE PISTON AND CYLINDER
DEVICE WITH NON-ROTATABLE PISTON
Alton S. Vanderhoof, Livingston, N.J.
(59 Evergreen Drive, North Caldwell, N.J.)
Filed Jan. 14, 1963, Ser. No. 251,273
6 Claims. (Cl. 92—163)

This invention relates in general to a pneumatic or hydraulic piston and cylinder device or similar apparatus wherein the cylinder and piston are relatively longitudinally reciprocable but relatively non-rotatable.

A primary object of the invention is to provide in such a device novel and improved means whereby the piston rod is restrained from rotating within extremely close limits throughout its entire stroke, and in such a manner as to resist tremendous torque loads on the piston rod, with minimum effect on the device's operating efficiency and cost and requiring a minimum addition to the overall physical dimensions and a minimum additional weight.

Another object of the invention is to provide in such a device a novel and improved construction and combination of a cylinder, a piston reciprocable therein, guide rods passing through openings in the piston and connected to the cylinder heads, and packing means for preventing leakage of fluid around said guide rods and past the piston from one side of said piston to the other.

Other objects, advantages and results of the invention will be brought out by the following description in conjunction with the accompanying drawings in which FIGURE 1 is a central vertical sectional view through a piston and cylinder device embodying the invention, showing the piston near one limit of its stroke;

FIGURE 3 is a transverse vertical sectional view on the plane of the line 3—3 of FIGURE 1;

FIGURE 4 is a similar view on the plane of the line 4—4 of FIGURE 1; and

FIGURE 5 is a composite fragmentary sectional view of one of the packing discs and a fragmentary side elevation of one end of a guide rod.

Figure 1:
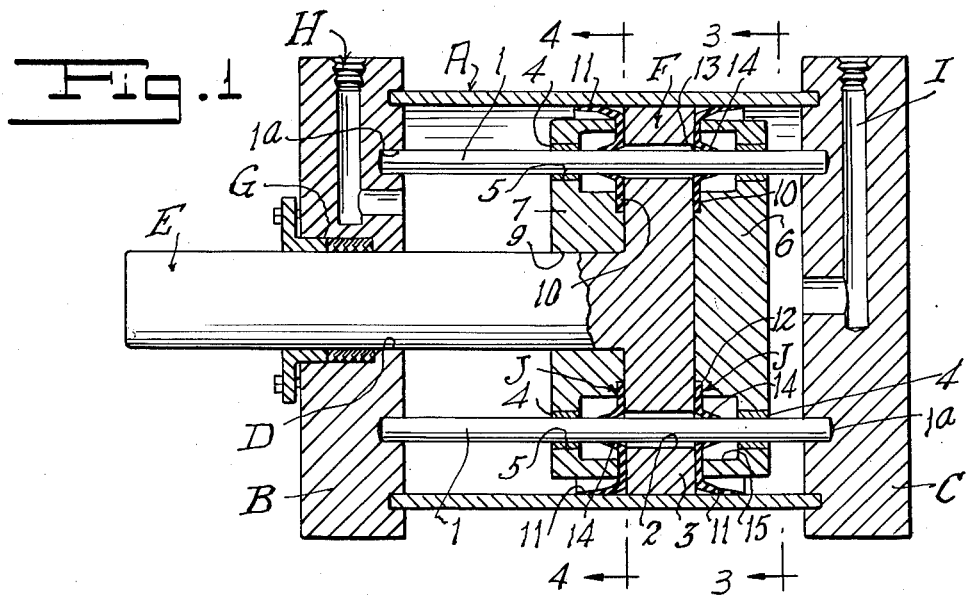
Figure 2:
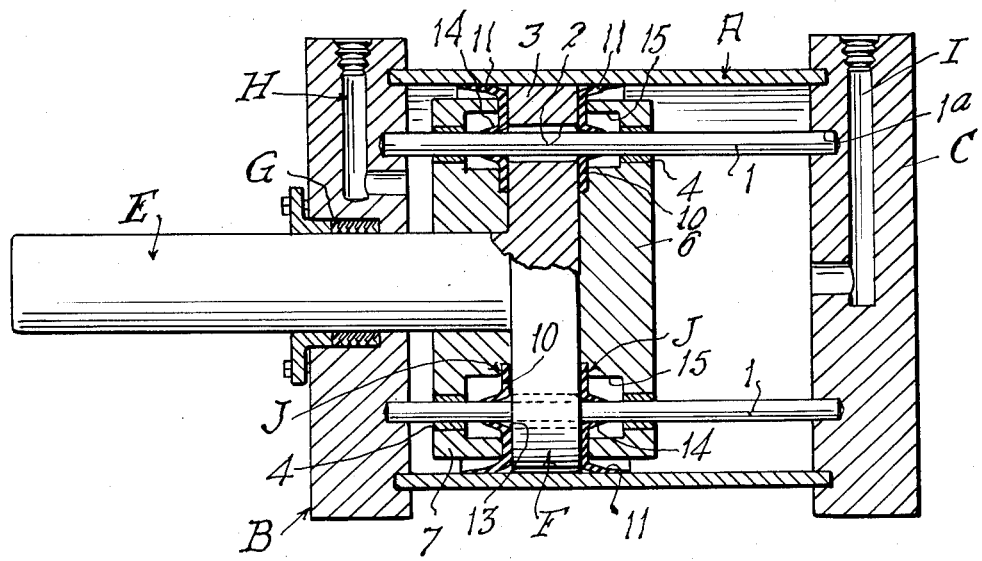
FIGURE 2 is a similar view showing the piston near the other limit of its stroke.

The invention is susceptible of use in many different fluid pressure piston and cylinder devices and is not particularly concerned with the construction of the cylinder, and therefore a simple type of cylinder has been schematically shown in the drawings.

The reference character A designates the cylinder body the ends of which are closed by the respective cylinder heads B and C which are rigidly connected to the cylinder body in fluid-tight relation thereto in any suitable manner. One of the heads has a central opening D therethrough which serves as a guide for the rod E of a piston F which is reciprocably mounted in the cylinder, there being the usual packing gland G between the cylinder head and the piston rod. The cylinder heads have the respective passages H and I communicating with the cylinder at opposite sides of the piston and adapted to be connected to suitable sources of fluid pressure through known types of control valve means.

The invention relates particularly to means for preventing rotation of the piston within extremely close limits throughout the entire stroke of the piston, and said means are shown as comprising at least one and preferably a plurality of guide rods 1 that have their opposite ends tightly fitted into blind recesses 1A in the cylinder heads and that pass loosely through the respective longitudinal openings 2 in the main piston section 3 and through guide bushings 4 that are snugly fitted into holes 5 in end plates 6 and 7 that are fastened on the main piston section 3 in any suitable manner as by screws 8. One of the end plates, the plate 7, has a central opening 9 through which passes the piston rod E.

These end plates 6 and 7 serve as combined guides for the piston on the rods and clamps for securing to the piston the sealing elements generally designated J.

It will be understood by those skilled in the art that the rods 1 are preferably equidistantly spaced radially from the axis of the piston and that the bushings 4 have a close sliding fit on the corresponding guide rods. In accordance with the invention, each sealing element J comprises a ring 10 of suitable material such as flexible rubber having a perimetral tapered flange 11, each ring being clamped between one end surface of the main piston section and the corresponding end plate 6 or 7, the end plate preferably being rabbeted at 12 to provide a recess for the packing ring. Each ring has a hole 13 therethrough in alignment with a corresponding opening in the other ring and through which one of the guide rods 1 extends. Sealing each hole 13 is a frusto-conical sealing lip 14. The sealing lips 14 of the rings extend longitudinally of the piston toward the adjacent cylinder head as best shown in FIGURE 1, and the larger end of each frusto-conical opening 13 is slightly greater in diameter than the corresponding end of the guide rod while the smaller end of the opening is slightly smaller in diameter than the guide rod so that as the guide rod is slipped through the opening, the lip is expanded. The thickness of the lip from the ring toward the outer end of the lip gradually decreases to provide maximum flexibility so that as air or hydraulic pressure is applied to the outer surface of the lip, the lip is forced tighter around the rod so that the greater the pressure, the better the seal. It will also be observed that the sealing elements J are tightly held against rotation and distortion by the end plates 6 and 7 and the screws or bolts 8 of the piston.

The mechanical advantages of the invention during the operation of the device are as follows. As the piston is urged in one direction by the air or liquid pressure through port I and is near the end of the stroke where most of the work is done in many applications of the piston and cylinder device, the guide rods are almost in full shear so that there is a maximum of resistance to piston load torque or twist, i.e., if the guide rods 1 are located 2 inches radii from the axis of the piston, are ¼ inch diameter and have 80,000 lbs. tensile strength, the resistance to torque can be calculated as: ¼ inch diameter=.049 square inch cross section .049×80,000×2 inches radii×2 rods or 15,680 inch lbs. torque at shear using a safety factor of 4=15,680/4=3920 i.p.t. The invention could be applied in a 5 inch bore cylinder, and it is readily understood that these values would far exceed any desired load imposed on a cylinder of this size. The radii distance and the diameter of the guide rods can be calculated to meet any torque load requirement.

The sealing elements J insure tight sealing of the piston against leakage of fluid pressure from one side to the other of the piston, and at the same time the sealing elements are devoid of "pinch fault" such as would be incident to an O-ring packing in a reciprocating action; and therefore the seals of the invention may be expected to have a longer life and better sealing action over a longer period of time than, for example, an O-ring packing. The guide rods add only a minimum of weight to the device, being about ¼ inch in diameter, and the invention will have a minimum effect on the operating efficiency and cost of the device and will add a minimum of physical dimensions and weight to the piston and cylinder. The added cost in material would be small and at the same time the extreme accuracy of operation of the piston without rotation or drift is achieved and would highly beneficially affect the operation of, for example, a punch and die by the device where arcurate mating of the punch and die is required. When the cylinder is to have an extra long stroke, the number and size or diameter of the guide rods would be custom fitted to meet any torque load requirements.

Each of the end plates 6 and 7 has a recess 15 in its inner face into which projects one of the sealing lips of the corresponding sealing element whereby said sealing lips are protected from injury.

It may be desirable for ease and economy in manufacture to make the seal between the piston and the cylinder body and the seal between the piston and the rods separately and independently of different pieces of material instead of forming them in one sealing element as shown in the drawings; and the invention contemplates such a construction where it is desirable.

It will be understood that other modifications and changes can be made in the structural details within the spirit and scope of the invention.

I claim:

1. In a fluid pressure device including a piston reciprocable in a cylinder having a cylindrical body and opposite cylinder heads provided with passages for fluid pressure, means for preventing rotation of said piston and for preventing flow of fluid from one side of said piston to the other comprising at least one guide rod extending longitudinally of the cylinder parallel to and spaced from the axis of the cylinder with its ends rigidly connected to said cylinder heads, the piston having an opening through which said rod extends, and a resilient sealing element secured to at least one end of said piston and having a perimetral flange extending toward the corresponding cylinder head and slidably engaging the inner surface of said cylinder body, said sealing element also having a hole therethrough and a resilient lip extending from one side thereof in encircling relation to said hole and frictionally engaging the rod to prevent passage of fluid under pressure in one direction from one side of said piston to the other.

2. In a fluid presure device including a piston reciprocable in a cylinder having a cylindrical body and opposite cylinder heads provided with passages for fluid pressure, means for preventing rotation of said piston and for preventing flow of fluid from one side of said piston to the other comprising at least one guide rod extending longitudinally of the cylinder parallel to and spaced from the axis of the cylinder with its ends rigidly connected to said cylinder heads, the piston having an opening through which said rod extends, and resilient sealing elements each secured to one end of said piston and having a perimetral flange extending toward the corresponding cylinder head and slidably engaging the inner surface of said cylinder body, each sealing element also having a hole therethrough and a resilient lip extending therefrom in encircling relation to said hole and resiliently frictionally engaging the guide rod to prevent passage of fluid under pressure in one direction from one side of said piston to the other.

3. In a fluid pressure device as defined in claim 2, the addition of an end plate secured to each end of the piston and having a guide opening in alignment with one of said holes in the sealing elements with its wall in slidable engagement with said rod.

4. A fluid pressure device as defined in claim 2, each of said sealing elements comprising a substantially flat ring portion having a resilient tapered perimetral flange frictionally engaging the inner surface of the cylinder body, and wherein said piston includes a main section and with the addition of an end plate secured to each end of said main section and clamping between it and said main section the ring portion of one of said sealing elements.

5. A fluid pressure device as defined in claim 2, each of said sealing elements comprising a substantially flat ring portion having a resilient tapered perimetral flange frictionally engaging the inner surface of the cylinder body, and wherein said piston includes a main section and with the addition of an end plate secured to each end of said main section and clamping between it and said main section the ring portion of one of said sealing elements, and wherein each end plate has a recess into which extends one of said lips of the corresponding sealing element.

6. For use in a fluid pressure device that includes a piston having a main section and opposite end plates secured thereon reciprocable in a cylinder and means for preventing rotation of said piston including at least one guide rod extending through an opening in the piston longitudinally of the cylinder in spaced parallel relation to the axis of the cylinder with its ends rigidly connected to the heads of the cylinder, a resilient sealing means for preventing leakage around said guide rod including a flat resilient ring secured to said piston between each of opposite ends of said main section and the corresponding end plate and having a hole therethrough in register with said opening in the piston and a resilient lip extending therefrom in encircling relation to said hole and resiliently frictionally engaging the guide rod to prevent passage of fluid under pressure through said opening in the piston in one direction from one side of the piston to the other.

References Cited in the file of this patent
UNITED STATES PATENTS
2,849,244    Sampson _____ Aug. 26, 1958